United States Patent [19]

De George et al.

[11] 4,213,733

[45] Jul. 22, 1980

[54] AUTOMATIC SIDE GAUGE FOR MACHINE TOOL WORKPIECE CONTROL AND METHOD

[75] Inventors: Robert P. De George, Kenmore; Paul R. Brown, Akron; Victor T. Carbone, West Seneca, all of N.Y.

[73] Assignee: Houdaille Industries, Inc., Fort Lauderdale, Fla.

[21] Appl. No.: 720,803

[22] Filed: Sep. 7, 1976

[51] Int. Cl.² .............................................. B25J 13/00
[52] U.S. Cl. ...................................... 414/751; 83/412; 271/227; 271/236; 271/253; 414/677
[58] Field of Search .................... 214/1 BB, 1 S, 1 F, 214/1.6; 271/227, 228, 236, 243, 245, 246, 247, 253, 254, 255; 83/71, 409, 412, 414, 415; 318/467, 575

[56] References Cited

U.S. PATENT DOCUMENTS

| 2,482,443 | 9/1949 | Törnros | 271/227 |
| 3,293,971 | 12/1966 | Kuss | 83/412 |
| 3,302,494 | 2/1967 | Taysom et al. | 83/412 |
| 3,671,363 | 6/1972 | Bruder | 271/243 |

OTHER PUBLICATIONS

IBM Technical Disclosure Bulletin, vol. 17, No. 10, Mar. 1975, "Sheet Positioning Apparatus", K. A. Lennon + C. R. Spurlock.

Primary Examiner—John J. Love
Assistant Examiner—Ross Weaver
Attorney, Agent, or Firm—Hill, Van Santen, Steadman, Chiara & Simpson

[57] ABSTRACT

A machine tool is illustrated having a workpiece support table on which a workpiece is moved by an automatically controlled workpiece gripper movable in the X and Y directions. Movement of the gripper in at least the X direction is controlled in reference to a base line which is set within the automatic control in response to abutment of the workpiece edge against a table supported stop, the stop being movable against a spring from a rest position through a first or base line set in position in response to abutment by the moving edge of the workpiece carried by the gripper. Movement of the stop through the first position automatically sets the base line within the automatic control.

3 Claims, 7 Drawing Figures

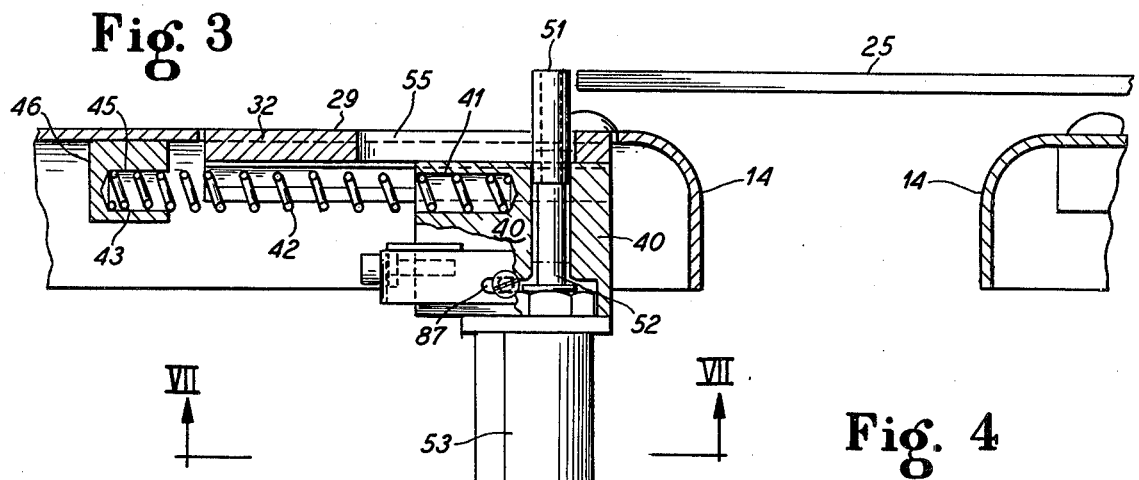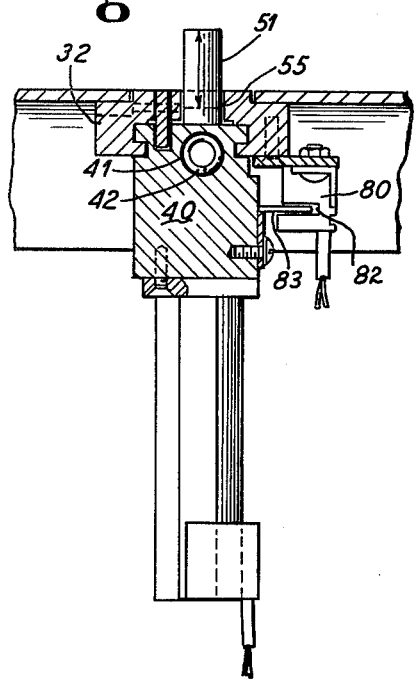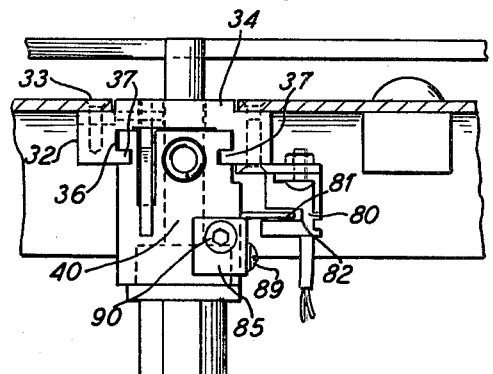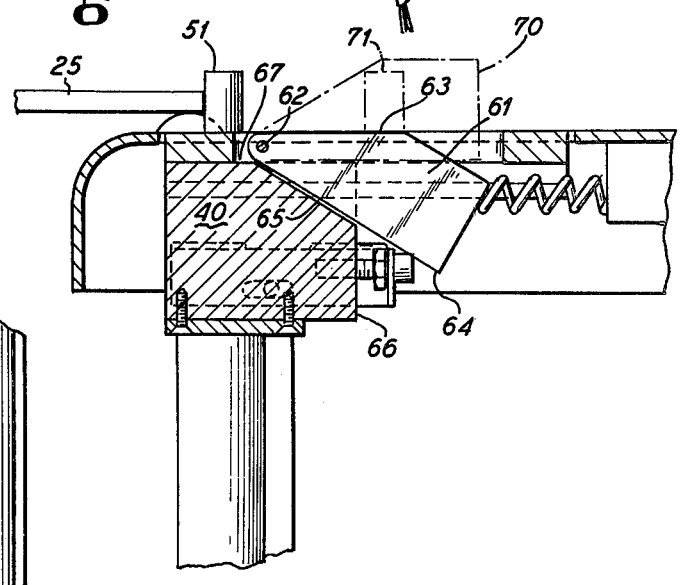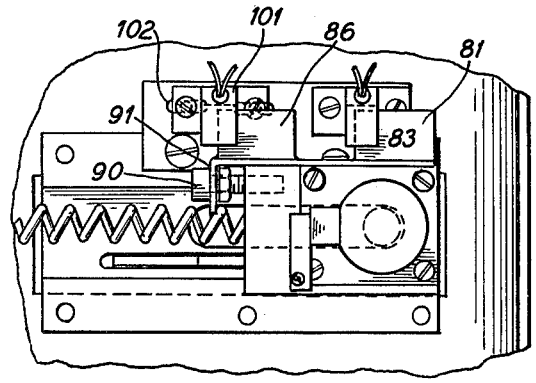

AUTOMATIC SIDE GAUGE FOR MACHINE TOOL WORKPIECE CONTROL AND METHOD

BACKGROUND OF THE INVENTION

1. Field of the Invention

This invention relates to machine tools and more particularly to control systems for moving workpieces in relation to machine tools.

2. Prior Art

Machine tools, and particularly turret punch presses include a machine having a work station with a workpiece support table partially encompassing the work station and projecting forwardly thereof. The workpiece is supported on the table and is moved thereon with respect to the work station by a workpiece gripper mechanism which includes a carriage movable in the Y directions representing movement inwardly and outwardly with respect to the machine tool work station and in the X directions representing movement laterally of the work station.

The workpiece gripper is automatically controlled from a control center and has the capability, by movement in both the X and Y directions, to present any desired exact point of the workpiece at the work station. In order to provide for precise movement of the workpiece, the automatic control must have reference points in both the X and Y direction. Further these reference points or base lines must be correlated to the position of the workpiece in the grippers so that there is a direct correlation between positioning of the grippers with respect to the base lines and positioning of the workpiece with respect to the work station.

Previously, it has been known to provide abutment faces in both the X and Y directions whereby edges of the workpiece can be presented to the abutment faces and thereafter gripped by the grippers which are located at predetermined positions with respect to the work station. In this manner, at least two edges of the workpiece will be located at predetermined positions and the grippers will be located at predetermined positions prior to the start of machining operations.

We have found that it is also possible to set the lateral or X axis base line by first positioning the workpiece in the grippers and then moving the grippers and workpiece in the X axis until the leading edge of the workpiece abuts a stop. At this point movement of the grippers is stopped and the base line is thereafter set within the automatic controls with reference to the position of the grippers at the time of abutment of the workpiece leading edge with the stop.

While such a base line setting system is highly desirable in that a large variety of workpiece sizes can be accommodated since the base line is not set until after the workpiece has been positioned in the grippers, it is undesirable in that the moving workpiece is forced against a stationary stop. This can result in deflection of or damage to the stop, and damage to the workpiece edge. Additionally, should some failure occur and should the carriage fail to stop moving at the time of edge abutment with the stop, extensive damage can occur both to the stop and to the mechanism for controlling movement of the grippers.

It would therefore be an advance in the art to eliminate the stationary stop while preserving the ability to set the base line after gripping of the workpiece by the grippers.

SUMMARY OF THE INVENTION

Our invention provides a new type of stop and a new method of setting the gripper carriage base line controls. The invention is particularly adapted for use in connection with machine tool turret punches which are equipped with workpiece support tables and automatically controlled movable workpiece grippers.

The method of setting the gripper control base line in the X axis involves the step of loading the workpiece into the grippers, causing the grippers to move in the X axis towards an abutment stop, contacting the abutment stop with a leading edge of the workpiece, moving the abutment stop from a rest position, triggering a circuit by movement of the abutment stop to a first position spaced from the rest position, and setting the base line for the X axis within the control for the gripper carriage in response to the triggering of the circuit.

The stop of our invention consists of a projectable stop member attached to an undersurface of a stationary portion of the workpiece supporting table with the stop being projected to a position above the top surface of the workpiece supporting table. The stop is carried in a slide allowing it to move in the X axis direction and is spring urged to a rest position. Therefore, abutment of the stop by the leading edge of the moving workpiece will cause movement of the stop in the slide against the spring. The moving portion of the stop assembly is equipped with switch activator means which cooperate with fixed switch means carried by stationary portions of the stop assembly. Thus, as the projected stop is contacted by the leading edge of the moving workpiece at the rest position, it will move with the workpiece in the X direction until the moving switch activator activates the stationary switch. At that point, movement of the carriage will be stopped and the base line for movement in the X directions will be set within the automatic control. Thereafter, further movement of the carriage in the X directions will use the newly set base line as a reference. By placing the switch at a position where activation will occur at a precise distance from the center line of the machine tool, the exact positioning of the one edge of the workpiece with respect to the machine tool center line will be known at the time of activation of the switch. This is true irrespective of the overall dimension in the X directions of the workpiece.

In order to provide a fail-safe in the event that activation of the switch at the first position fails to stop movement of the carriage, a second stationary switch is positioned on the stationary portion of the stop assembly and is activated by a second switch activator. This switch is positioned at a second position downstream of the first position in the direction of introductory movement of the workpiece. Activation of the second switch, indicating an overrun condition caused by movement of the leading edge of the workpiece past the first position, will activate a circuit to the gripper control causing an "all stop" condition freezing the gripper carriage and telling the operator, by means of warning lights or the like, that the base line set has failed and that the systems should be rerun.

In order to prevent damage from occurring to the workpiece, the stop or the gripper carriage, movement of the stop past the first and second positions causes a stationary ramp to project upwardly into the path of the moving workpiece. Further movement of the workpiece will cause the stop to withdraw behind the ramp slope surface and the workpiece to move upwards on the slope surface above the stop thereby removing the leading edge of the workpiece from contact with the stop at a point prior to the point of greatest permissible travel for the stop.

After successfully setting the base line as above described, the stop is withdrawn by a power member to a position below the surface of the support table at which position it will activate a limit switch clearing the carriage for full operation in the X axis directions.

It is therefore an object of this invention to provide a machine tool workpiece movement system wherein a control base line for use as a reference in control of future movement of the workpiece carriage is set by abutment of an edge of the workpiece with a movable stop, movement of the stop actuating a circuit to set the base line.

It is another and more specific object of this invention to provide a workpiece stop for positioning a workpiece on a support table wherein the stop is movable in a direction of movement of the workpiece by contact with a portion of the moving workpiece.

It is a general object of this invention to provide a non-fixed stop for locating workpieces in reference to a machine tool.

It is a more specific object of this invention to provide a method of locating a workpiece with respect to a stationary machine tool which comprises the steps of projecting a movable stop above a surface of a workpiece support table, enclamping a workpiece in a gripper mechanism, moving the gripping mechanism and workpiece towards the stop, contacting the stop with an edge of the workpiece, moving the stop by continued movement of the workpiece, sensing the arrival of the moving stop at a predetermined first position, setting a base line within a control for the workpiece gripper in dependent response to arrival of the moving stop at the predetermined first position and thereafter withdrawing the stop from projection above the worktable surface.

It is a more specific object of this invention to provide a workpiece supporting table having a movable stop, the stop including a slide assembly mounted on an undersurface of the worktable, the slide assembly including a stationary slide portion which slidably carries a movable slide portion spring means urging the movable slide portion to a rest position, a projectable stop carried by the movable slide portion with power means for projecting the stop to a position above a top surface of the table and for withdrawing the stop to a position below the top surface of the table and a switch device having a stationary portion operatively carried by the table in a fixed position, the switch assembly being activated by the movement of the movable portion of the slide assembly.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure, and in which:

BRIEF DESCRIPTION OF THE DRAWINGS

FIG. 3 is a fragmentary cross-sectional view taken along the lines III—III of FIG. 2.

FIG. 4 is a fragmentary cross-sectional view taken along the lines IV—IV of FIG. 2.

FIG. 5 is a fragmentary cross-sectional view taken along the lines V—V of FIG. 2.

FIG. 6 is a fragmentary cross-sectional view taken along the lines VI—VI of FIG. 2.

FIG. 7 is a bottom plan view taken substantially along the lines VII—VII of FIG. 3.

DESCRIPTION OF THE PREFERRED EMBODIMENT

Figure 1:
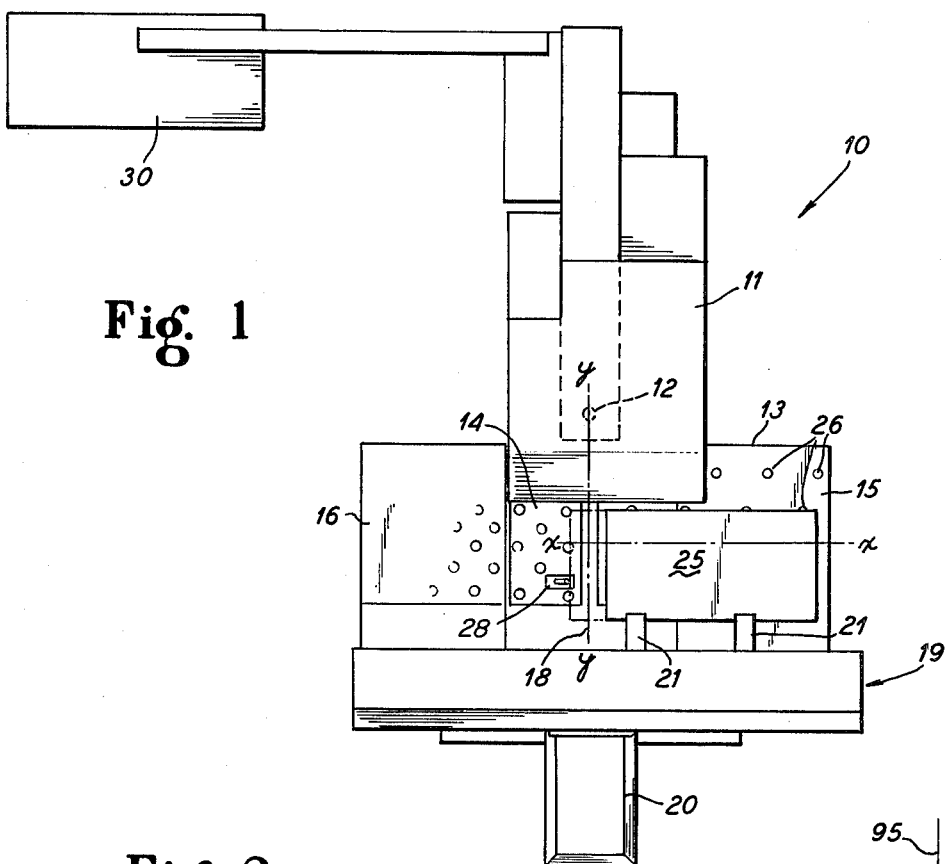
FIG. 1 is a diagrammatic top plan view of a turret punch machine tool equipped with workpiece control mechanisms and the movable stop of this invention.

FIG. 1 illustrates a machine tool assembly 10 consisting of a machine tool 11 such as a turret punch press having a work station 12 and a workpiece supporting table 13. The table 13 includes a central stationary section 14 having an inward portion substantially surrounding the work station and a forward portion positioned in front of the machine tool. Lateral side portions 15 and 16 of the workpiece supporting table are movable towards and away from the machine tool in a direction of travel indicated by the line 18 which is hereinafter referred to as the Y axis directions. A carriage assembly 19 includes motor controls 20 for causing movement of the carriage and the lateral tables 15 and 16 in the Y axis directions. The carriage 19 has workpiece grippers 21 which are movable laterally of the Y axis direction and of the die center line (herein referred to as the X axis directions). The grippers 21 are capable of gripping workpiece 25 adjacent one edge thereof for movement of the workpiece over the remainder of the support table which, for this purpose is equipped with anti-friction roller elements 26.

Control of the carriage assembly in both the X and Y axis, as well as control of the tool carrying turrets and of the machine ram is by means of an automatic control center 30 such as a computer or a punch tape reader or the like.

Examples of workpiece clamps such as the clamps 21 are found in U.S. Pat. No. 3,595,112 to De George, the teachings of which are incorporated herein by reference.

Examples of control systems for controlling movement of the gripper carriage assembly and of the machine tool are found in U.S. Pat. Nos. 3,634,662 and 3,596,266 to Slawson and U.S. Pat. No. 3,622,763 to Barber, the teachings of all of which are herein incorporated by reference.

A feature of common necessity in all prior art machine tools equipped with workpiece movers of the type herein described is positive location of the workpiece with respect to the work station 12. This is accomplished by locating the grippers 21 with respect to the work station and then specifically locating the workpiece with respect to the grippers. Normally the grippers 21 are equipped with stop ledges against which one edge of the workpiece is abutted when the grippers are in a known position. This serves to locate the workpiece in the Y directions.

Heretofore location of the workpiece in the X directions was accomplished by moving one edge of the workpiece to a predetermined position on the table where the edge abutted a fixed stop. Thereafter, with the clamps 21 located in a known position on the X axis, the workpiece was positioned in the clamps.

As a modification of the prior locating systems, it would be possible to place the workpiece in the clamps 21 against the ledge thereby fixing the Y axis location of the workpiece and to thereafter move the workpiece and clamps in the X axis direction until the workpiece contacted the fixed stop. When this occurs, movement of the clamps and workpiece would cease and the then present position of the clamps be read into the control 30 as a zero or reference position on the X axis. Since the leading edge of the workpiece would then be located precisely at a predetermined position, the control would have effective knowledge of the positioning of the workpiece. While such a system would have the distinct advantage of allowing the clamps to be attached at a desirable spot on the workpiece to properly support any given size of workpiece, a disadvantage arises in that a moving workpiece abutting a fixed stop can damage the workpiece, the stop or the gripper carriage or any combination thereof.

Figure 2:
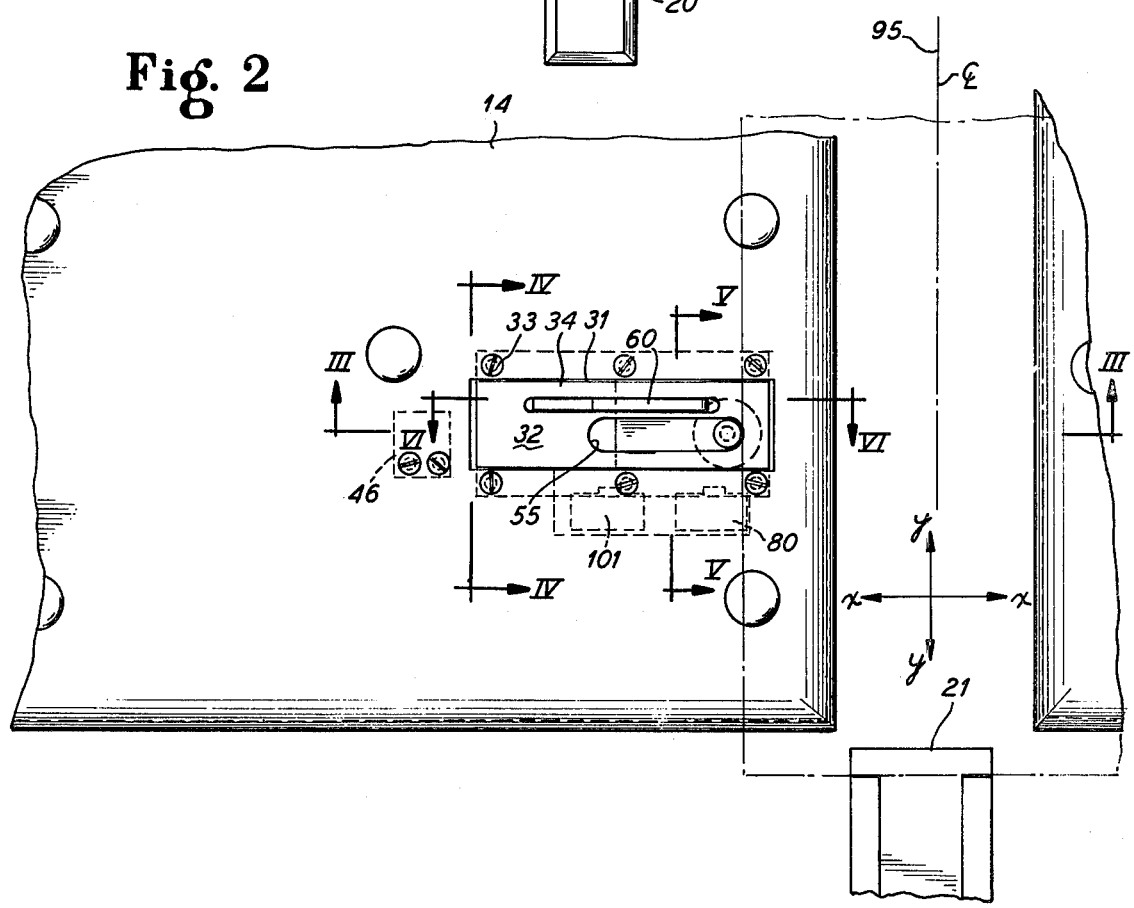
FIG. 2 is an enlarged fragmentary top perspective view of the movable stop portion of the assembly of FIG. 1 with underlying portions shown by broken lines.

In order to overcome this disadvantage, our invention incorporates a moving stop assembly 28. In the embodiment illustrated, as best shown in FIG. 2, an elongated opening 31 is provided through the forward portion of the stationary table 14. A fixed slide member 32 has a major portion thereof affixed to the undersurface of the table as by means of bolts 33 or the like, the major portion extending beyond the sides of the opening 31. A central portion 34 projects upwardly through the opening 31 and has a top surface 29 which is substantially co-planar to the table surface. The bottom surface of the stationary slide 32 has a C-shaped cross section groove 36 therein providing inwardly extending flanges 37 defining a center opening. A movable slide 40 has a somewhat T-shaped head received in the C-shaped groove and supported therein by the flanges 37.

The movable slide is slidable lengthwise of the stationary portion. The movable slide 40 is considerably shorter than the stationary portion and has a bore 41 in an end face 66 thereof which receives one end of a spring 42. The other end 43 of the spring is received in a bore 45 in a stationary spring mount 46 which is attached to the undersurface of the table 14 beyond the opening 31. The spring 42 urges the movable slide 40 to one end of the stationary slide where an abutment may be provided preventing further movement. For descriptive purposes, the position of the movable slide adjacent the one end of the stationary slide will hereinafter be referred to as the rest position.

The movable slide has a vertical bore 50 therethrough which receives a stop member 51 which is connected to the power arm 52 of a power member such as a hydraulic or pneumatic cylinder or the like, 53 which depends from the movable slide 40. Activation of the power member 53 in one direction will cause the stop 51 to project upwardly through an elongated slot 55 which is located centrally of the stationary slide and which opens to the C-shaped groove 36. The stop 51 is projectable to a level sufficiently above the level of the table 14 so as to be engaged by a workpiece 25 which is moving over the table 14 when the workpiece is gripped in the clamps 21. Activation of the power member 53 in the opposite direction will withdraw the stop 51 to a level below the top of the stationary slide.

A second elongated slot 60 parallel to the slot 55 is provided through the stationary slide 32 and extends beyond the end of the slot 55 remote from the rest position. Received in the slot 60 is a guard ramp member 61 best illustrated in FIG. 6. The guard ramp member is pivotably attached in the slot as at 62 and has a slope face 63 which, when in the full down position illustrated by solid lines in FIG. 6 lies substantially planar with the top of the stationary slide 32. A second face 64 at an angle to the face 63 mates with a chamfered face 65 of the moving slide 40. The chamfered face extends from the end face 66 of the moving slide into which the bore 41 extends to a top face 67. The face 65 supports the guard ramp member 61 in the position illustrated by solid lines in FIG. 6 when the movable slide is at the rest position. Thereafter movement of the movable slide from the rest position towards the spring mount 46 will cause pivoting of the guard ramp 61 around the pivot point 62 so that the face 63 is pivoted into projection above the table surface. When the top flat face 67 of the moving slide supports the face 64, the ramp face 63 will project above the level of greatest projection of the stop 51.

The dimensioning of the guard ramp 61 is such that as the stop 51, and therefore the movable slide 40, are moved by contact with a moving workpiece 25 away from the rest position, before the stop 51 will reach the end of the slot 55, the ramp will have been fully extended to the broken line position illustrated at 70 and the stop, as illustrated at 71 will be positioned behind the ramp face 63. Thus the workpiece 25 will ride up the ramp face 63 and over the top of the stop 71 preventing any injury to the stop or slide mechanism in case of overtravel of the workpiece.

In order to provide for setting of the X axis base line, a stationary switch 80 is attached to and carried by the stationary slide 32 below the table 14. The position of the switch 80 is precisely determined with respect to the center line of the work station 12 either by independently precisely positioning the switch 80 or by precisely positioning the stationary slide portion 32. A switch actuator 81 is carried by the moving slide portion 40. In the embodiment illustrated, the switch 80 is a Hall effect switch having a slot 82 therein through which a vane 83 may move. The vane constitutes the switch actuator 81.

The vane 83 is adjustably carried on the moving slide 40 and may, for example, be formed as a projection of a bracket member 85 carrying a second vane 86 in spaced relation to the vane 83. The bracket member has an elongated opening 87 therein which may receive a lock screw 89 for locking the bracket 85 in position on the side of the moving slide 40. Loosening of the lock screw 89 will allow movement of the bracket with respect to the moving slide 40, and an adjustment screw 90 may be provided extending into a threaded bore in the end face 66 of the moving slide and acting upon an inturned flange 91 of the bracket which overlaps the end face 66. In this manner, the point of movement of the slide 40 at which actuation of the switch 80 will occur is precisely controllable so that it can be predetermined where the location of the abutting face of the stop 51 will be with respect to the turret center line 95 at the time of actuation of the switch 80. Thus irrespective of the positioning of the clamps 21 at that time, it will be predetermined where the leading edge of the workpiece 25 is. By using a signal from the switch 80 to reset the X axis position counter to zero or some other reference position, all future movement of the workpiece in the X axis directions will be accurately controlled by the control 30 with respect to the leading edge of the workpiece.

In addition to setting the X axis control, activation of the switch 80 will terminate movement of the carriage until such time as the stop 51 has been retracted as indicated by actuation of the limit switch 100 attached to the power member 53.

In order to insure that the control 30 has been properly set, a second Hall effect switch 101 is attached similarly to the switch 80 and spaced a short distance therefrom, as indicated in FIG. 7. The second vane 86 activates the switch 101. The switch 101 may be adjustably mounted as indicated at 102 so that the amount of travel beyond the point of activation of the switch 80 which is necessary before activating the switch 101 can be preset. Activation of the switch 101 will cause the control 30 to stop all movement of the carriage and to signal a warning that the switch 80 failed to set the X axis reference properly.

As a specific example of a device such as above described, we would equip a machine tool turret punch workpiece support table with a slide and movable stop wherein the movable slide 40 has a total permissible travel of 2.250 inches. The point of actuation of the switch 80 will be located 3.500 inches from the die center line of the machine, and the bracket 85 specifically adjusted so that the vane 83 will activate the switch 60 when the stop 51 has its workpiece abutted face positioned exactly 3.500 inches from the die center line. This point of activation can be referred to as a first position for the stop spaced from the rest position. The rest position would be approximately 0.06 inches towards the center line from the first position thereby allowing the stop to travel 0.06 inches before activation of the switch. The second switch 101, and its associated vane 86 will be positioned so that movement of the movable slide portion 40 approximately 0.005 to 0.010 inches past the first position will activate the switch 101. The point of activation of the switch 101 can be termed a second position. By placing the second position extremely close to the first position, it will be assured that a very minimum amount of overtravel will result in the control 30 giving a failure warning. This preserves the desired high accuracy of the setting of the reference position since the failure to properly set the reference position, and therefore stop movement of the carriage, will be identified within a further travel of between 0.005 and 0.010 inches.

It is to be understood that the above example, and particularly the dimensions given is by way of illustration only and that other positions, dimensions and spacings can be used.

OPERATION OF THE DEVICE

The above described device results in an automatic method of gauging workpieces on machine tools. In accordance with our invention, the method is practiced by initially positioning the grippers sufficiently to one side, in the X direction, of the moving stop assembly so that the workpiece can be loaded into the grippers at a desired point on the workpiece while maintaining a clearance relationship with the stop 51. Thereafter a gauging sequence is activated which is controlled by the control 30. First the control activates the power cylinder 53 to project the stop 51 to a full extended position above the surface of the table 14 at the rest position. This will be confirmed by the switch 100. Thereafter the carriage 19 will be program controlled moved in the X axis towards the stop 51. As the leading edge of the workpiece 25 abuts the stop 51, it will cause movement of the stop and the movable slide 40. Movement of the movable slide 40 will cause the vane 83 to enter into the slot 82 of the switch 80 activating the switch 80.

Activation of the switch 80 will close a circuit which causes the control 30 to stop further movement of the carriage in the X axis and to set the X axis register at zero or some other reference point. Failure of the carriage to stop movement at the first position will cause the vane 86 to actuate the switch 101 at the second position thus indicating an overtravel of the workpiece and a failure to achieve the proper setting. Activation of the switch 101 will cause the control 30 to stop all movement of the carriage and to signal a warning to the operator to reposition the workpiece and to initiate the gauging sequence again. Should both of the switches 80 and 101 fail to cause the control 30 to stop movement of the carriage 19, further movement of the slide 40 will cause the guard ramp 61 to project upwardly so that the workpiece 25 will slide up the surface 63 and out of contact with the stop 51.

After the X axis base line has been properly set through a proper activation of the switch 80 without overtravel of the carriage, the control 30 will cause retraction of the stop 51 to a position below the surface of the table 14 which position will be sensed by the switch 100 to clear the control 30 for further operation of the machine tool and carriage assembly.

Although the teachings of our invention have herein been discussed with reference to specific theories and embodiments, it is to be understood that these are by way of illustration only and that others may wish to utilize our invention in different designs or applications.

We claim as our invention:

1. The method of setting a workpiece position control for machine tools which comprises the steps of providing an automatically controlled movable workpiece gripping mechanism, providing a movable stop member movable between a rest position and an end of travel position spaced from the rest position, loading a workpiece onto the workpiece gripping mechanism, projecting a portion of the movable stop member into a path of movement of the workpiece carried by the workpiece gripper mechanism, causing movement of the workpiece gripper mechanism and workpiece in the path towards the movable stop member, contacting the movable stop member at the first position by a leading edge of the workpiece, continuing movement of the workpiece and causing movement of the movable stop member away from the rest position to a first position spaced from the rest position in the direction of movement of the workpiece, sensing the presence of the movable stop at the first position and setting a base line reference within an automatic control for the workpiece gripping mechanism in dependent response to the sensing of the presence of the movable stop member at the first position, including the additional steps of providing a first carriage stop movement signal to the automatic control upon sensing the presence of the stop at the first position, sensing failure of the carriage to stop at the first position as a result of the first stop signal by sensing the presence of the stop at a second position closely spaced from the first position, providing a second carriage stop movement signal to the automatic control upon sensing the presence of the stop at the second position.

2. The method of setting a base line within an automatic control for a machine tool having an automatic control controlled workpiece moving gripper carriage which comprises the steps of: loading the workpiece into the gripper carriage, moving the carriage and workpiece along an axis in one direction into workpiece abutment contact with a machine carried stop member at a stop member rest position, continuing movement of the carriage, workpiece and stop member from the rest position to a stop member first position spaced from the rest position, sensing positioning of the stop member at the first position, providing an input to the control in response to the sensed position at the first position to cause the control to set a base line reference for the axis within the control for referencing further movement of the carriage along that axis, including the additional step of providing an input to the control in response to the sensed position of the stop member at the first position to cause the control to stop movement of the carriage with an edge of the workpiece in abutment with the stop member adjacent the first position, including the additional steps of: sensing failure of the control to stop movement of the carriage with the edge of the workpiece adjacent the first position by sensing positioning of the stop member at a second position closely spaced to the first position in the one direction, providing an input to the control in response to the sensing of the positioning of the stop member at the second position to cause the control to stop movement of the carriage and to provide an operator indicator signal for advising the operator of overtravel of the workpiece.

3. The method of setting a base line within an automatic control for a machine tool having an automatic control controlled workpiece moving gripper carriage which comprises the steps of: providing an automatic control for causing movement in X and Y axis directions by reference to a zero point for each axis, at least one of the zero points being indeterminant, loading the workpiece in the gripper carriage, moving the carriage and workpiece along one axis in one direction, the one axis having an indeterminant zero point, abutting a machine tool carried stop member with a leading edge of the gripper called workpiece, sensed the abutment of the stop member and workpiece edge at a predetermined point on the axis, as a result of said sensing providing an input to the control providing a new zero point setting for said axis, said zero point setting being a base line reference from the new zero point for the one axis within the control for referencing further movement of the carriage along that one axis, the base line being set in accordance with the position of the gripper carriage along the axis at the time of said sensing.

* * * * *

UNITED STATES PATENT AND TRADEMARK OFFICE
CERTIFICATE OF CORRECTION

PATENT NO. : 4,213,733                                Page 1 of 2

DATED : July 22, 1980

INVENTOR(S) : Robert P. DeGeorge, Paul R. Brown & Victor T. Carbone

It is certified that error appears in the above—identified patent and that said Letters Patent is hereby corrected as shown below:

Delete Figure 3 of the drawings and substitute the attached Figure therefore.

Column 2, line 22, cancel "projected", and insert "projectable".
Column 2, line 60, cancel "systems", and insert "system".
Column 10, line 14, cancel "called", and insert "carried".
Column 10, line 14, cancel "sensed", and insert "sensing".

UNITED STATES PATENT AND TRADEMARK OFFICE
CERTIFICATE OF CORRECTION

PATENT NO. : 4,213,733

DATED : July 22, 1980

INVENTOR(S) : Robert P. Degeorge et al.

It is certified that error appears in the above—identified patent and that said Letters Patent is hereby corrected as shown below:

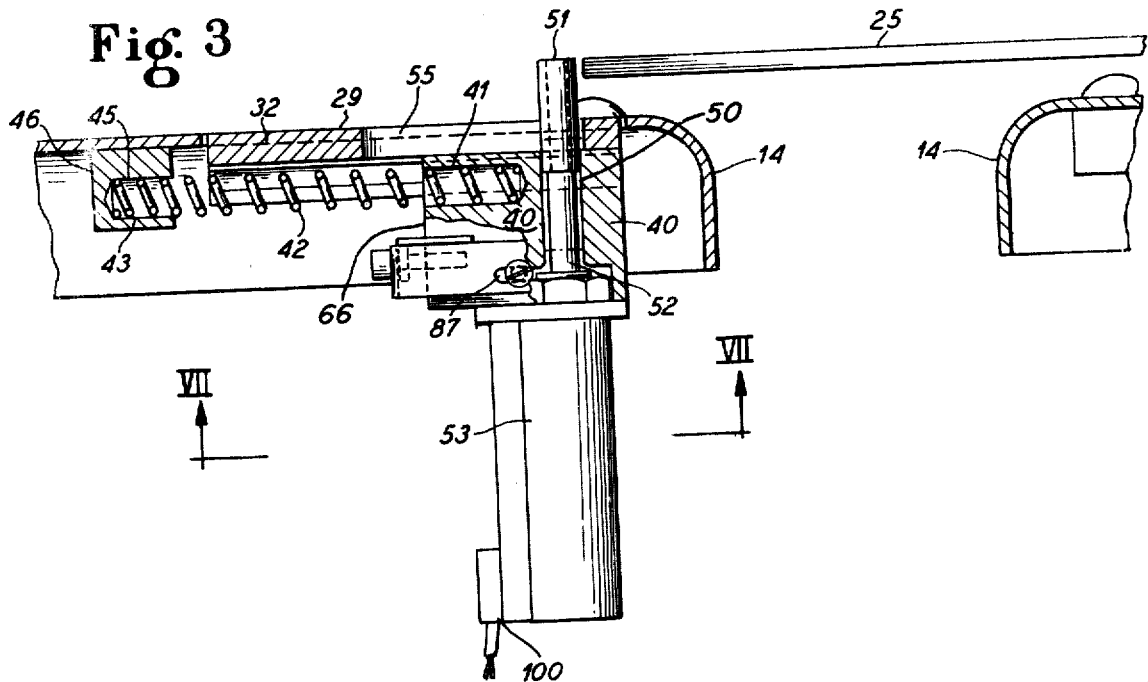

Signed and Sealed this

Eleventh Day of August 1981

[SEAL]

Attest:

GERALD J. MOSSINGHOFF

Attesting Officer     Commissioner of Patents and Trademarks